United States Patent
Grosser et al.

(10) Patent No.: US 10,187,293 B2
(45) Date of Patent: Jan. 22, 2019

(54) APPARATUS AND METHOD FOR MULTICAST DATA PACKET FORWARDING

(71) Applicant: Extreme Networks, Inc., San Jose, CA (US)

(72) Inventors: Donald B. Grosser, Apex, NC (US); Vanitha Neelamegam, Chennai (IN); Maruthamuthu Palani, Chennai (IN); Balasubramanian Ramu, Chennai (IN); Kannan Selvaraj, Chennai (IN)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 14/861,838

(22) Filed: Sep. 22, 2015

(65) Prior Publication Data

US 2016/0014018 A1 Jan. 14, 2016

Related U.S. Application Data

(63) Continuation of application No. 13/842,382, filed on Mar. 15, 2013, now Pat. No. 9,143,437.

(51) Int. Cl.
| | |
|---|---|
| *H04L 12/28* | (2006.01) |
| *H04L 12/761* | (2013.01) |
| *H04L 12/18* | (2006.01) |
| *H04L 12/46* | (2006.01) |
| *H04L 12/64* | (2006.01) |

(52) U.S. Cl.
CPC ............. *H04L 45/16* (2013.01); *H04L 12/18* (2013.01); *H04L 12/1886* (2013.01); *H04L 12/4641* (2013.01); *H04L 12/6418* (2013.01)

(58) Field of Classification Search
USPC .......................... 370/389, 395.54, 400, 469
See application file for complete search history.

(56) References Cited

U.S. PATENT DOCUMENTS

| | | | | |
|---|---|---|---|---|
| 6,115,385 A | * | 9/2000 | Vig | .................. H04L 29/12009 370/401 |
| 6,457,059 B1 | * | 9/2002 | Kobayashi | ............ H04L 12/185 709/242 |

(Continued)

OTHER PUBLICATIONS

"Notice of Allowance for U.S. Appl. No. 13/842,382, dated May 15, 2015, 11 pages."

(Continued)

*Primary Examiner* — Phuongchau Ba Nguyen
(74) *Attorney, Agent, or Firm* — Sterne, Kessler, Goldstein & Fox, P.L.L.C.

(57) ABSTRACT

A switching device supports a mixed mode of operation using both layer 2 and layer 3 multicast forwarding tables for multicast forwarding of packets. In the mixed mode of operation the switching device programs multicast forwarding entries in a corresponding layer 2 or layer 3 table depending on a type of protocol to be used for multicast forwarding. The switching device programs multicast forwarding entries in the layer 3 table for multicast packets forwarded using layer 3 routing protocols, and in the layer 2 table for multicast packets forwarded using layer 2 protocols. The switching device converts layer 3 multicast information to layer 2 multicast information before programming multicast forwarding entries in the corresponding layer 2 table.

20 Claims, 3 Drawing Sheets

(56) References Cited

U.S. PATENT DOCUMENTS

| | | | |
|---|---|---|---|
| 6,532,233 B1* | 3/2003 | Matsunaga | H04L 12/185 370/390 |
| 6,553,028 B1 | 4/2003 | Tang et al. | |
| 7,590,114 B1 | 9/2009 | Bishara | |
| 7,720,055 B2 | 5/2010 | Kadambi et al. | |
| 7,933,268 B1* | 4/2011 | Melman | H04L 12/18 370/245 |
| 2003/0012202 A1* | 1/2003 | Fukutomi | H04L 12/185 370/395.52 |
| 2003/0202513 A1* | 10/2003 | Chen | H04L 45/16 370/390 |
| 2009/0003317 A1 | 1/2009 | Kasralikar et al. | |
| 2009/0122801 A1* | 5/2009 | Chang | H04L 12/4645 370/395.53 |
| 2009/0304008 A1* | 12/2009 | Kono | H04L 12/4641 370/395.53 |
| 2016/0014018 A1* | 1/2016 | Grosser | H04L 45/16 370/390 |

OTHER PUBLICATIONS

"Office Action for U.S. Appl. No. 13/842,382", (dated Oct. 29, 2014), Whole Document.

\* cited by examiner

*L3 (IP) Table 105*

*L2 (MAC-VLAN) Table 110*

APPARATUS AND METHOD FOR MULTICAST DATA PACKET FORWARDING

CLAIM OF PRIORITY

This application is a continuation of, and claims the benefit of the earlier filing date of non-provisional application Ser. No. 13/842,382 filed on Mar. 15, 2013, entitled "APPARATUS AND METHOD FOR MULTICAST DATA PACKET FORWARDING."

TECHNICAL FIELD

Embodiments of the present invention relate to data communications. In particular, embodiments relate to using both OSI model layer 2 and layer 3 forwarding database tables in a switching device to make multicast data packet forwarding decisions.

BACKGROUND ART

In data communication networks, multicast data packet routing or forwarding allows a source host to send a data packet to a group of destination hosts without requiring that the source host copy the packet and send each copy individually to each destination in the group. In OSI Model Layer 3 devices (e.g., a data networking router), multicast routing is accomplished, for example, using a group destination Internet Protocol (IP) address in the range of 224.x.x.x to 239.x.x.x for IP version 4 (IPv4), or in the range of FFxx:xxxx:xxxx:xxxx:xxxx:xxxx:xxxx:xxxx for IP version 6 (IPv6), as the destination IP address in the IP header of a multicast data packet. In OSI Model Layer 2 devices (e.g., a switch), multicast forwarding is accomplished using a Multicast IEEE 802.3 Media Access Control (MAC) address in the range of 01:00:5E:xx:xx:xx for IPv4, or in the range of 33:33:xx:xx:xx:xx for IPv6, as the destination MAC address in the Data Link header of the multicast data packet.

Layer 2 multicast forwarding may be achieved by configuring a layer 2 multicast Forwarding Database (FDB) table in a layer 2 switch with entries that each specify a particular multicast MAC address, a Virtual Local Area Network (VLAN) identifier (VLAN ID), and a corresponding list of ports on the layer 2 device out which a multicast data packet specifying the multicast MAC address and VLAN is to be transmitted for forwarding purposes. The list of ports may be dynamically learned using the Internet Group Management Protocol (IGMP) (IPv4)/Multicast Listener Discovery (MLD) (IPv6) snooping protocols. The layer 2 FDB table normally includes both unicast MAC address entries and multicast MAC address entries.

Layer 3 multicast data packet forwarding or routing may achieved by configuring a layer 3 multicast FDB table in a switching device with entries that each specify a particular source IP address, a group (or multicast) destination IP address, a VLAN ID, and a corresponding list of ports (along with a list of VLAN IDs for each port) on the switching device out which a multicast data packet specifying the group destination IP address and VLAN ID is to be transmitted. The list of ports may be dynamically learned using the IGMP snooping protocol. The list of VLAN IDs per port may be learned using a layer 3 multicast routing protocol, such as Protocol Independent Multicast (PIM), or Multicast VLAN Registration (MVR).

Note, the switching device may be a layer 2 device or a layer 3 device. In particular, the switching device does not have to be a layer 3 device to utilize the layer 3 table lookups. For example, current switches utilize layer 3 table lookups even when they are performing a layer 2 device role (e.g. IGMP snooping).

Prior art switch and router architectures use either the layer 3 multicast FDB or the layer 2 MAC FDB to provide multicast forwarding to provide both layer 2 multicast data packet forwarding and layer 3 multicast data packet routing. In the prior art, even though a layer 2 FDB table may have sufficient space for storing multicast MAC address entries, the layer 2 FDB table is used only for storing unicast MAC address entries for unicast data packet forwarding.

What is needed is a method and apparatus utilizing both the layer 2 multicast FDB table and the layer 3 multicast FDB table for multicast forwarding and thereby significantly increase the number of available FDB table entries.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DESCRIPTION OF THE EMBODIMENTS

Figure 1:
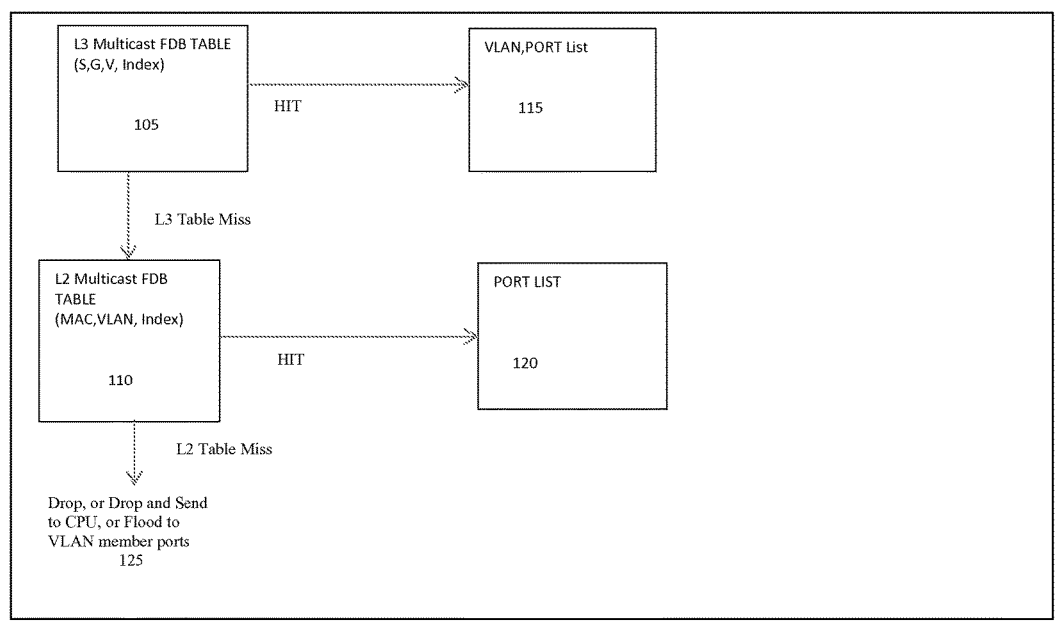
FIG. 1 illustrates an aspect of an embodiment of the invention.

Embodiments of the invention use both layer 2 and layer 3 lookup tables in making IP multicast data packet traffic forwarding decisions. With reference to FIG. 1, an embodiment of the invention implements, for example, in conjunction with hardware managed by a multicast manager module, the illustrated egress tables 115, 120 and corresponding cache entries 105, 110. In FIG. 1, boxes 105 and 115 refer also to corresponding layer 3 operations, and boxes 110 and 120 refer to corresponding layer 2 operations. According to one embodiment of the invention, as a first step, a layer 3 multicast FDB table lookup is performed at 105 upon a layer 3 device receiving a layer 3 multicast data packet, e.g., a IP multicast data packet, using the layer 3 (e.g., IP) source address (S), the layer 3 (e.g., IP) destination address (e.g., IP multicast group address (G)), and the VLAN ID (V) from the header of the IP multicast data packet, as input. If the look up is successful, that is, if a matching entry is found, or a "hit" occurs, in the layer 3 cache, an index to the layer 3 egress table 115 is output. However, if there is a miss at layer 3, that is, if the layer 3 multicast data packet is not recognized, then, as a second step, a layer 2 multicast FDB table lookup is performed at 110 using the received packet's destination MAC address (MAC) and VLAN ID (VLAN) as input. If the look up is successful, that is, if a matching entry is found, or a "hit" occurs, in the layer 2 cache, an index to the layer 2 egress table 120 is output. If a miss occurs both at the layer 3 cache and the layer 2 cache, the received packet is dropped (discarded), or dropped and sent to a processor for management functions, or flooded out all ports associated with the VLAN ID (v) specified in the header of the packet.

In one embodiment of the invention, the layer 3 device operates in what is termed herein as a mixed mode of operation, or simply, mixed mode, to denote the device is utilizing both the layer 2 multicast FDB table (cache table 110) and the layer 3 multicast FDB table (cache table 105) for programming the multicast cache entries. In mixed mode, cache entries are programmed in the corresponding layer 3 cache table 105 or the layer 2 cache table 110 depending on the type of multicast packet that is received and the value of the cache type associated with each cache table.

A cache type field associated with each cache table specifies which layer 2 or layer 3 multicast forwarding or routing protocol module initiates adding or deleting a cache entry into which layer 2 or layer 3 cache entry table. For example, if a layer 3 multicast routing protocol (e.g., PIM) module initiated the cache add, a cache entry is programmed in to the layer 3 (L3) cache table 105 given PIM is a cache type that is associated with the layer 3 cache entry table. Likewise, if a layer 2 multicast forwarding protocol (e.g., IGMP snooping) module initiated the cache add, then the cache entry is programmed in to the layer 2 (L2) cache table 110 given IGMP is a cache type that is associated with the layer 2 cache entry table. In one embodiment of the invention, table 1 below provides guidelines for programming multicast FDB entries into an appropriate cache table while operating in mixed mode:

TABLE 1

Cache distribution table

| Cache Type | Cache Table |
|---|---|
| PIM | L3 Cache |
| MVR | L3 Cache |
| Private VLAN | L3 Cache |
| IGMP/MLD SNOOPING | L2 Cache |

Figure 2:
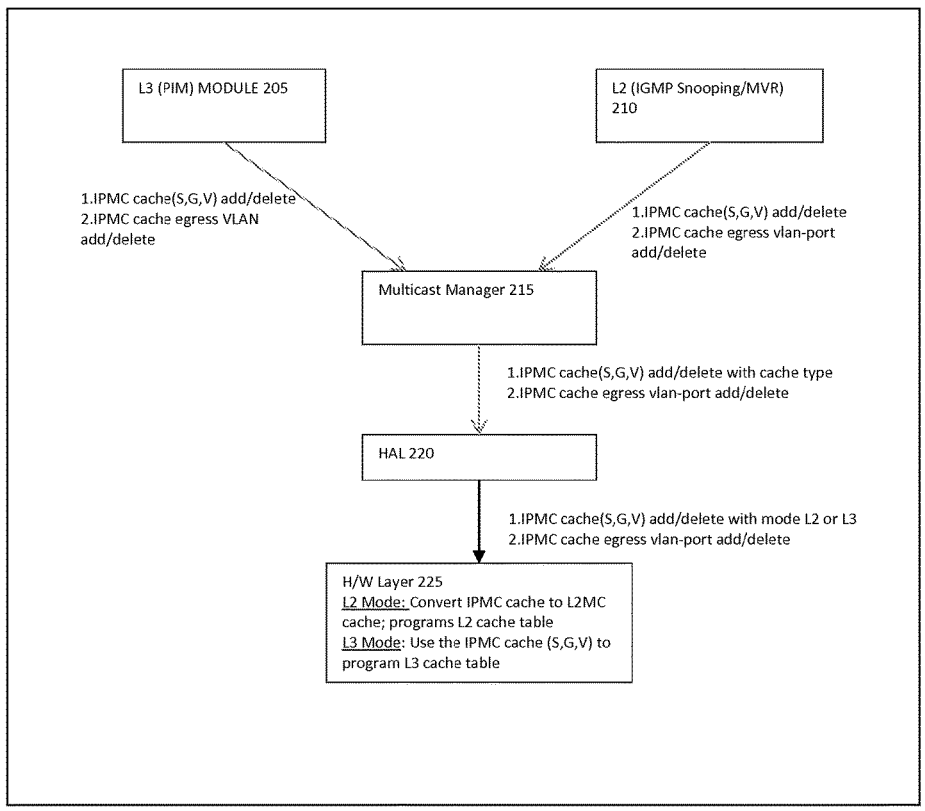
FIG. 2 illustrates an aspect of an embodiment of the invention.

With reference to FIG. 2, an embodiment of the invention determines the multicast FDB table location as follows. If the cache type of the multicast data packet forwarding or routing protocol module that is programming the cache table is a layer 3 (L3) module 205, e.g., PIM, such module coordinates with a multicast manager module 215 to program entries in the layer 3 cache table 105. If, on the other hand, the cache type of the multicast data packet forwarding or routing protocol module that is programming the cache table is a layer 2 (L2) module 210, e.g., IGMP snooping, such module coordinates with multicast manager module 215 to program entries in the layer 2 cache table 110.

The multicast manager module 215, in one embodiment of the invention, coordinates with a hardware abstraction layer 220 to determine the cache type for each cache table and to program the actual entries into the appropriate cache table. Hardware abstraction layer 220 coordinates with hardware layer 225 to create the actual cache entries in the correct cache table, including converting layer 3 multicast information to layer 2 multicast information for programming a cache entry in to the layer 2 cache table when operating in mixed mode and when the cache type is mapped to a layer 2 cache table. In one embodiment, hardware layer 225 includes a software interface to receive messages from hardware abstraction layer 220 to control the hardware for programming the cache entry with the appropriate values of S, G, V, or MAC, VLAN, as the case may be.

Figure 3:
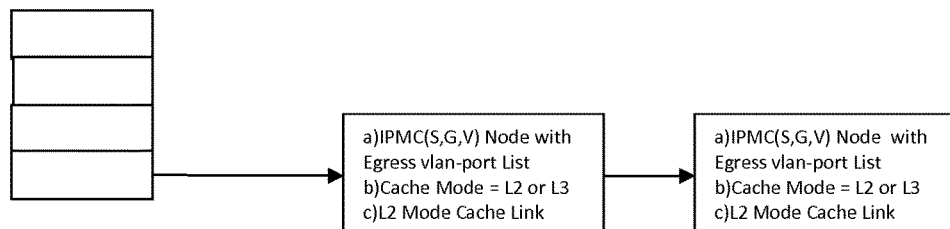
FIG. 3 illustrates an embodiment of the invention.
Figure 3:
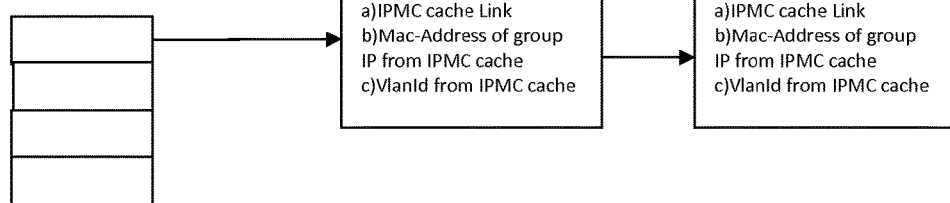

With reference to FIG. 3, according to one embodiment of the invention, a layer 3 device's operating system maintains database software for supporting linked lists of software copies of cache entries to be inserted into respective layer 3 or layer 2 cache tables 105 and 110, as appropriate depending on the cache type. In one embodiment, such software executes within hardware abstraction layer 220. In one embodiment, inserting cache entries is accomplished as follows.

1. A layer 3 multicast (e.g., Internet Protocol multicast (IPMC)) cache node is created in a list, for example, a linked list, for each cache add operation requested by a layer 3 multicast routing protocol module, such as a PIM or IGMP Snooping module. This cache node is a software copy of the cache entry to be created in the cache table 105 in hardware.
2. Depending on the cache type (e.g., PIM or Snoop or MVR), the IPMC node's cache mode field is set, according to table 1 above, that is, Cache Mode=L2 or Cache Mode=L3.
3. If the IPMC node's cache mode is layer 2 (Cache Mode=L2), then the IP multicast group address is converted into a layer 2 (MAC) multicast group address and VLAN ID (from inputs S, G, V (see FIG. 1)) and that information is ultimately used to create the corresponding cache table entry 110 and egress table entry 120.
4. The nodes in the MAC-VLAN cache link list maintain a link with corresponding IPMC nodes in the IPMC linked list, and vice versa, for faster lookup operations.

It should be noted that in the above-described operation, the MAC-VLAN nodes are only created if the associated cache entries are to be added to the L2 cache table 110.

In one embodiment of the invention, the database that maintains a linked list of IPMC nodes contains in each node the appropriate corresponding cache information (Source IP address, IP multicast group address and VLAN ID) to create entries in cache table 105, and further contains the information to create corresponding egress VLAN, port lists in table 115. Additionally, each IPMC node in the list contains flags indicating L2_MODE or L3_MODE to indicate the cache table that is to be programmed with the information in the node to create a cache table entry.

In one embodiment, a multicast group MAC address-VLAN ID database element based on a multicast group MAC address key is created for the entries to be created or inserted into the layer 2 cache table 110. If an entry is to be inserted into the layer 2 cache table, a layer 2 index is allocated instead of a layer 3 index.

With further reference to FIG. 2, the hardware abstraction layer 220, in one embodiment, communicates with hardware layer 225 via a software layer or interface to receive messages from hardware abstraction layer 220 that programs the hardware with a new cache entry with the appropriate values of S, G, V and cache mode set to layer 2 or layer 3 as the case may be. The software layer processes each message, determines if the cache mode=L2, and if so, then converts the IP multicast group address to a MAC multicast group address and programs the layer 2 cache table accordingly. If, on the other hand, the cache mode=L3, the software layer programs the layer 3 cache table using the inputs S,G,V derived from the received packet, as described above.

In one embodiment of the invention, static FDB configuration allows the creation of FDB entries for multicast MAC addresses using, for example, a command line interface (CLI) command. These entries are also inserted in the layer 2 cache table and are used for hardware-based packet forwarding. In one embodiment, if there is a conflict between a learned, dynamic, <MAC,VLAN> entry created by the Multicast Manager Module 215 and a static entry inserted by an FDB manager module, the static entry takes precedence and the dynamic entry is deleted in the hardware table.

In one embodiment of the invention, when IP multicast group address forwarding entries are using the layer 2 cache table, the multicast entries are inserted as static entries in the table to avoid undesirable interactions with layer 2 protocol- or user administered-FDB flushing. These layer 2 multicast entries may also take precedence over dynamic layer 2 unicast entries, in one embodiment.

In one embodiment of the invention, a switching device receives a data packet, searches for a layer 3 multicast destination address specified in a header of the received data packet in a layer 3 multicast forwarding database table, and searches for a corresponding port list in a layer 3 egress table if the layer 3 multicast destination address is found. If the layer 3 multicast destination address is not found, the device searches for a layer 2 destination address specified in a header of the received data packet in a layer 2 multicast forwarding database table, and searches for a port list in a layer 2 egress table if the layer 2 multicast destination address is found. The device discards the received packet or floods the received packet out all ports of the switching device if the layer 3 multicast destination address is not found and the layer 2 multicast destination address is not found.

In one embodiment, the layer 3 multicast destination address is an Internet Protocol multicast destination address. In yet another embodiment, searching for a layer 3 multicast destination address specified in a header of the received data packet in a layer 3 multicast forwarding database table further comprises additionally searching for a layer 3 source address specified in the header of the received data packet in the layer 3 multicast forwarding database table.

In one embodiment, a first index to a layer 3 egress table is returned if the layer 3 multicast destination address is found, and searching for a corresponding port list in a layer 3 egress table if the layer 3 multicast destination address is found comprises searching using the first index for a corresponding port list in a layer 3 egress table if the layer 3 multicast destination address is found.

In one embodiment, if the layer 3 multicast destination address is not found, the device searches for a multicast MAC address specified in a header of the received data packet in a layer 2 multicast forwarding database table. In another embodiment, if the layer 3 multicast destination address is not found, the device additionally searches for a virtual local area network identifier (VLAN ID) specified in the header of the received data packet in a layer 2 multicast forwarding database table.

In one embodiment, a second index to a layer 2 egress table is returned if the layer 2 multicast destination address is found, and that index is used to search for a port list in a layer 2 egress table if the layer 2 multicast destination address is found.

In the above description, numerous specific details are set forth. However, it is understood that embodiments of the invention may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention as discussed above may be implemented as a series of software routines executed by computer system. The software routines may comprise a plurality or series of instructions, code sequences, configuration information, or other data to be accessed and/or executed by a processing system such as one or more processors. Initially, the series of instructions, code sequences, configuration information, or other data may be stored in data storage and transferred to memory via a bus. It is to be appreciated that the series of instructions, code sequences, configuration information, or other data can be stored in a data storage using any conventional computer-readable or machine-accessible storage medium, such as a diskette, CD-ROM, magnetic tape, DVD, ROM, etc. The instructions, code sequences, configuration information, or other data may be copied from the data storage, such as mass storage, and accessed and executed by a processor.

In alternate embodiments, the present invention is implemented in discrete hardware or firmware. For example, one or more application specific integrated circuits (ASICs) could be programmed with some or all of the above-described functions of the present invention.

Accordingly, embodiments of an invention that improve multicast data packet forwarding are described. From the foregoing description, those skilled in the art will recognize that many other variations of the present invention are possible. Thus, the present invention is not limited by the details described. Instead, the present invention can be practiced with modifications and alterations within the spirit and scope of the appended claims.

The invention claimed is:
1. In a switching device, a method comprising:
receiving a request to program a multicast entry in a forwarding table for forwarding a data packet to multiple destinations, the forwarding table including a layer 2 table and a layer 3 table, the request associated with a layer 3 multicast group address;
identifying a protocol with which the request is associated, the protocol identified from among a plurality of protocols supported in the switching device;
determining a cache mode of the identified protocol to determine whether the identified protocol is associated with the layer 2 table or the layer 3 table;
in response to determining that the identified protocol is associated with the layer 2 table, converting the layer 3 multicast group address associated with the request into a layer 2 multicast group address;
programming the multicast entry for the layer 2 multicast group address associated with the request into the layer 2 table;
receiving a layer 3 multicast packet comprising a layer 3 address and a layer 2 address;
determining that the layer 3 address is not indicated in the layer 3 table;
in response to determining that the layer 3 address is not indicated in the layer 3 table, determining whether the layer 2 address of the layer 3 multicast packet is indicated by the multicast entry for the layer 2 multicast group address in the layer 2 table; and in response to determining that the layer 2 address of the layer 3 multicast packet is indicated by the multicast entry for the layer 2 multicast group address in the layer 2 table, forwarding the layer 3 multicast packet based on the layer 2 multicast group address.

2. The method of claim 1, further comprising:

determining whether the identified protocol with which the request is associated requires forwarding across VLANs based on mapping the identified protocol to a corresponding one of the layer 2 and layer 3 tables.

3. The method of claim 2, wherein the mapping is encoded in a cache distribution table that maps each of the plurality of protocols supported in the switching device to the corresponding one of the layer 2 and layer 3 tables.

4. The method of claim 1, wherein programming the multicast entry into the layer 3 table includes:

allocating a layer 3 index for insertion into the layer 3 table, the layer 3 index corresponding to the multicast group address; and programming table entries corresponding to the allocated layer 3 index for an egress VLAN and port lists associated with the request.

5. The method of claim 1, wherein programming the multicast entry into the layer 2 table includes:

converting the multicast group address associated with the request into a layer 2 multicast group address, the converted layer 2 multicast group address composed of a multicast group MAC address and egress VLAN associated with the request;

allocating a layer 2 index for insertion into the layer 2 table, the layer 2 index corresponding to the converted layer 2 multicast group address; and programming egress table entries corresponding to the allocated layer 2 index for ports in port lists associated with the request.

6. The method of claim 5, wherein programming the multicast entry into the layer 2 table further includes linking the multicast group address associated with the request with the converted layer 2 multicast group address.

7. The method of claim 1, wherein the identified protocol requires forwarding across VLANs when the identified protocol is any one of a Protocol Independent Multicast (PIM), Multicast VLAN Registration (MVR) and Private VLAN protocols.

8. The method of claim 1, wherein the identified protocol does not require forwarding across VLANs when the identified protocol is a snooping protocol, the snooping protocol including any one of an Internet Group Management Protocol (IGMP) and Multicast Listener Discovery (MLD) snooping protocol.

9. The method of claim 1, wherein the multicast entry is programmed into the layer 2 table as a static entry.

10. The method of claim 1, further comprising searching for a Virtual Local Area Network Identifier (VLAN ID) associated with the request in the layer 2 table.

11. An article of manufacture comprising:

a non-transitory computer-readable medium including instructions that, when executed on a computer processor, cause the processor to:

receive a request to program a multicast entry in a forwarding table for forwarding a data packet to multiple destinations, the forwarding table including a layer 2 table and a layer 3 table, the request associated with a multicast group address;

identify a protocol with which the request is associated, the protocol identified from among a plurality of protocols supported in a switching device;

determine a cache mode of the identified protocol to determine whether the identified protocol is associated with the layer 2 table or the layer 3 table;

in response to determining that the identified protocol is associated with the layer 2 table, convert the multicast group address associated with the request into a layer 2 multicast group address;

program the multicast entry for the layer 2 multicast group address associated with the request into the layer 2 table;

receive a layer 3 multicast packet comprising a layer 3 address and a layer 2 address;

determine that the layer 3 address is not indicated in the layer 3 table;

in response to determining that the layer 3 address is not indicated in the layer 3 table, determine whether the layer 2 address of the layer 3 multicast packet is indicated by the multicast entry for the layer 2 multicast group address in the layer 2 table; and in response to determining that the layer 2 address of the layer 3 multicast packet is indicated by the multicast entry for the layer 2 multicast group address in the layer 2 table, forward the layer 3 multicast packet based on the layer 2 multicast group address.

12. The article of manufacture of claim 11, wherein the instructions further cause the processor to:

determine whether the identified protocol with which the request is associated requires forwarding across VLANs based on mapping the identified protocol to a corresponding one of the layer 2 and layer 3 tables.

13. The article of manufacture of claim 12, wherein the mapping is encoded in a cache distribution table that maps each of the plurality of protocols supported in the switching device to the corresponding one of the layer 2 and layer 3 tables.

14. The article of manufacture of claim 11, wherein the instructions causing the processor to program the multicast entry into the layer 3 table include instructions to:

allocate a layer 3 index for insertion into the layer 3 table, the layer 3 index corresponding to the multicast group address; and program table entries corresponding to the allocated layer 3 index for an egress VLAN and port lists associated with the request.

15. The article of manufacture of claim 11, wherein the instructions causing the processor to program the multicast entry into the layer 2 table include instructions to:

convert the multicast group address associated with the request into a layer 2 multicast group address, the layer 2 multicast group address composed of a multicast group MAC address and egress VLAN associated with the request;

allocate a layer 2 index for insertion into the layer 2 table, the layer 2 index corresponding to the converted layer 2 multicast group address; and program egress table entries corresponding to the allocated layer 2 index for ports in port lists associated with the request.

16. The article of manufacture of claim 15, wherein programming the multicast entry into the layer 2 table further includes linking the multicast group address associated with the request with the converted layer 2 multicast group address.

17. The article of manufacture of claim 11, wherein the identified protocol requires forwarding across VLANs when the identified protocol is any one of a Protocol Independent Multicast (PIM), Multicast VLAN Registration (MVR) and Private VLAN protocols.

18. The article of manufacture of claim 11, wherein the identified protocol does not require forwarding across VLANs when the identified protocol is a snooping protocol, the snooping protocol including any one of an Internet Group Management Protocol (IGMP) and Multicast Listener Discovery (MLD) snooping protocol.

19. The article of manufacture of claim 11, wherein the multicast entry is programmed into the layer 2 table as a static entry.

20. The article of manufacture of claim 11, wherein the instructions further cause the processor to search for a Virtual Local Area Network Identifier (VLAN ID) associated with the request in the layer 2 table.

* * * * *